Nov. 21, 1933.                C. O. FAIRCHILD ET AL                1,935,703
                                    HYDROMETER
                               Filed Oct. 21, 1930
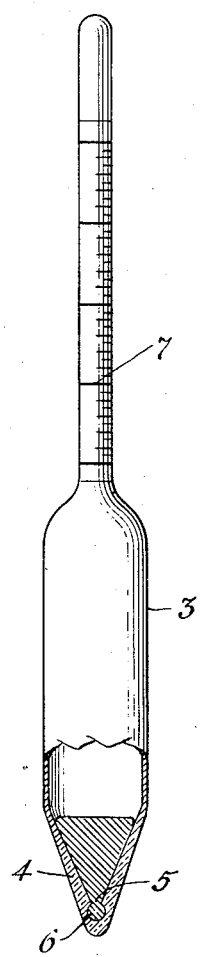
WITNESS                                              INVENTORS
                                                CHARLES O. FAIRCHILD
                                        BY      ROBERT M. WILHELM
                                                        ATTORNEYS Patented Nov. 21, 1933

1,935,703

UNITED STATES PATENT OFFICE 1,935,703

HYDROMETER

Charles O. Fairchild and Robert M. Wilhelm, Brooklyn, N. Y., assignors to Charles J. Tagliabue Mfg. Co., Brooklyn, N. Y., a corporation of New York Application October 21, 1930. Serial No. 490,120

2 Claims. (Cl. 265—45)

Our invention relates to hydrometers and particularly to that type of hydrometer in which a floating body is used to indicate the density or specific gravity of a liquid, the depth to which a specially prepared float sinks in such liquid being indicative of the density or specific gravity of the liquid. The object of our invention is to provide a new form of hydrometer, or hydrometer float, which possesses certain advantages over the type of hydrometers of the prior art which require lead shot or mercury as a ballast. The device of the prior art may be described as a cylindrical glass tube comprising a graduated stem above a hollow bulb, below which is a smaller bulb containing lead shot or mercury to make the instrument float upright.

A specific embodiment of our invention is illustrated in the accompanying drawing showing our improved hydrometer, partly in section, comprising a float of glass having a chamber 3, the lower end of which is approximately conical in cross-section, presenting no outward recesses or constrictions. The glass near such lower end of the chamber is thickened as at 4, the thickened portions terminating in a slight constriction 5 in the inner wall by means of which constriction a terminal recess or chamber 6 at the lowest portion of the interior of the glass float is formed.

The float 3 provided with a scale 7 at its upper end is purposely so constructed that the constriction 5 is located near the tip of such float where the diameter of the glass is so small that metals which contract on cooling, once solidified in the lower portion of the float, will not appreciably loosen therein.

The ballast used with our improved form of hydrometer or hydrometer float is a low melting metal or alloy, such as tin or an alloy thereof, which may be placed within the glass tubing forming the float in small lumps and melted therein so as to substantially fill the lower conical portion of the glass tubing including the small recessed chamber 6. Obviously, the metal may be introduced into the tube in a molten condition. When the metal or alloy forming such ballast has once cooled and solidified, it will be permanently secured in the lower conical portion of the hydrometer, being held in place therein by means of the constriction 5. The metal or alloy used as a ballast should, of course, be one that remains solid within the range of temperatures encountered by the hydrometer in the course of its employment.

It is obvious that the advantages of our improved hydrometer are obtained by forming a tubing so as to provide a chamber in its lower portion and having a projection on the inner wall of said chamber extending into said chamber and into the metal body so as to retain said body in a predetermined position within the chamber. The preferred embodiment of our invention comprises a hydrometer having a chamber, the glass near the lower end of which is thickened, such thickened portions forming a slight constriction in the inner wall of the chamber.

The particular advantages of our new type of construction are the lower cost of manufacture than that involved in the mercury ballast type, the elimination of the necessity of using wax to hold the lead shot in place in the shot-ballast type and that it presents substantially no outward recesses or constrictions.

While we have described a specific embodiment of our invention, it is obvious that various modifications thereof in the specific configuration of its elements and the arrangement of the parts may be made without departing from our invention.

We claim:

1. In a hydrometer, a glass float having an upper portion substantially circular in horizontal cross-section and, integral therewith, a lower portion substantially in the form of an inverted cone whose base is not substantially smaller than such horizontal section, such lower portion enclosing a ballast chamber and having portions of its wall above the bottom of such chamber but substantially adjacent said bottom thickened so as to extend closer to the axis of the float than other portions of such wall, thus forming a constriction in such ballast chamber, and ballast material constituting a solid body of metal, infusible within the range of working temperatures of the hydrometer, substantially filling the lower portion of the ballast chamber and extending substantially above the most constricted portion of the ballast chamber, and held in place by such constriction.

2. In a hydrometer, a glass float having an upper portion substantially circular in horizontal cross-section, a lower portion integral therewith, said lower portion being substantially in the form of an inverted cone the end of which merges into a rounded tip disposed entirely within the contour of said cone, such lower portion enclosing a ballast chamber, the inner walls of said tip being thickened substantially adjacent but spaced from the extreme end thereof to form a small anchoring chamber provided with a narrow neck, and ballast material constituting a solid body of metal, infusible within the range of working temperatures of the hydrometer, completely filling said anchoring chamber and extending materially above said neck to fill the lower portion of said ballast chamber substantially, said anchoring chamber and neck being small enough to keep the metal in the ballast substantially immovable even when said metal contracts.

CHARLES O. FAIRCHILD.
ROBERT M. WILHELM.